Patented Jan. 5, 1937

2,067,013

UNITED STATES PATENT OFFICE 2,067,013

PROCESS FOR PRODUCING THE DISODIUM SALT OF IMIDODICARBOXYLIC ACID

Robert B. MacMullin, Niagara Falls, N. Y., assignor to The Mathieson Alkali Works, Inc., New York, N. Y., a corporation of Virginia No Drawing. Application October 2, 1935, Serial No. 43,178

3 Claims. (Cl. 260—112)

My invention relates to the production of the compound having the formula:

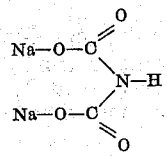

which is hereinafter referred to as disodium imidodicarboxylate. More particularly my invention relates to the production of disodium imidodicarboxylate by heating sodium carbamate. This application is in part a continuation of my prior co-pending application, Serial No. 607,510, filed April 25, 1932.

It has been proposed to prepare disodium imidodicarboxylate by heating sodium carbamate at temperatures of 200° C. and upwards. I have discovered, however, that disodium imidodicarboxylate can be prepared by heating dry sodium carbamate in a dry atmosphere at temperatures below 200° C. Temperatures of 100°–190° C. may be used in carrying out the process of my invention. Temperatures of 125°–150° C. are advantageous, a temperature of 140°–150° C. being particularly advantageous.

While conversion of sodium carbamate to disodium imidodicarboxylate can be effected at temperatures of 200° C. and upwards, several advantages are to be obtained by carrying out the conversion according to the process of my invention. Disodium imidodicarboxylate is stable at temperatures up to 200° C., but at temperatures of about 200° C. it decomposes to form sodium carbonate and sodium cyanate. The use of temperatures of 200° C. and upwards involves danger of decomposition of the desired product, requiring critical control of reaction conditions to avoid excess decomposition. Again, maximum dissociation of the sodium carbamate to disodium imidodicarboxylate takes place at a temperature of 140°–150° C. It will thus be seen that the process of my invention affords advantages both with respect to the extent of conversion of sodium carbamate to disodium imidodicarboxylate and decomposition of the formed product. Further, these advantages are obtained while requiring less critical control of the reaction conditions, an important advantage in itself.

When dry sodium carbamate, $NaCO_2NH_2$, is heated to the temperatures employed in the process of my invention in a dry atmosphere, one-half of the nitrogen is evolved as ammonia to the substantial exclusion of carbon dioxide and water vapor, as follows:

$$2NaCO_2NH_2 \rightarrow (NaCO_2)_2NH + NH_3$$

The heating may be carried out under atmospheric pressure, sub-atmospheric pressures or pressures somewhat higher than atmospheric pressure. The compound so produced, disodium imidodicarboxylate, is a solid, stable at temperatures up to 200° C., and is less hygroscopic than sodium carbamate. It has valuable detergent and anti-acid properties. It is an advantageous household cleanser. It hydrolyzes, in water, to sodium bicarbonate and ammonium hydroxide, as follows:

$$(NaCO_2)_2NH + 3H_2O \rightarrow 2NaHCO_3 + NH_4OH$$

By heating this compound in the presence of water or water vapor, it may be converted to anhydrous sodium carbonate, $Na_2CO_3$, or to sodium sesquicarbonate, $NaHCO_3.Na_2CO_3.2H_2O$. By heating this compound to temperatures above 200° C., it may be converted to mixtures of sodium carbonate and sodium cyanate, $NaOCN$. I am aware that there have hitherto been suggestions that dry sodium carbamate is converted to sodium cyanate to the exclusion of other products, by heating. These suggestions are not in accord with the facts.

The following tabulations are reproduced to illustrate the effect of heat on sodium carbamate:

TABLE I

| Temp. ° C. | Vapor pressure $NaCO_2NH_2$ | | | |
|---|---|---|---|---|
| | Dynamic | | | Static |
| | $P_{NH_3}$ | $P_{CO_2}$ | $P_T$ | $P_T$ |
| 90 | 87.2 mm. | 59.3 | 146.5 | 161.3 |
| 135–140 | | | | About 710 |
| 160 | | | | >1850 mm. |

From the above table it will be apparent that the dissociation temperature of the sodium carbamate is just slightly above 140° C., because at the temperature of 140° C. the pressure had nearly approximated that of the atmosphere.

TABLE II

*Effect of heating NaCO₂NH₂ under NH₃ pressure*
*Note: Original P<sub>NH3</sub>=100 lb/sq. in. gauge*

| No. | Max. temp. °C. | Max. press. lbs./sq. in. | Time heating (hrs.) | NaCO₂NH₂ |
|---|---|---|---|---|
| Original | | 100 | | 100 |
| 1 | 90 | 275 | 19 | 100 |
| 2 | 150–180 | 400 | 5 | 0 |
| 3 | 350–400 | 550 | 4 | 0 |
| 4 | 450–500 | 600 | 8 | 0 |

Per cent of Na as

| No. | (NaCO₂)₂NH | Na₂CO₃ | NaCNO | NaCN |
|---|---|---|---|---|
| Original | 0 | 0 | 0 | 0 |
| 1 | 0 | 0 | 0 | 0 |
| 2 | 73 | 13 | 14 | 0 |
| 3 | 33 | 51 | 16 | 0 |
| 4 | 0 | 77 | 21 | 2 |

From Table I it will be seen that sodium carbamate dissociates at about 145° C. when heated even in the absence of air to give off ammonia and some carbon dioxide. The higher the temperature the greater will be the proportion of ammonia to carbon dioxide. Table II shows the results of heating sodium carbamate under an original NH₃ pressure of 100 lbs./sq. in. gauge. From the table it is seen that sodium carbamate undergoes no change upon being heated to 90° C. but that its dissociation to form (NaCO₂)₂NH has passed its peak at 150°–180° C. In the last example of Table II fusion of the mixture occurred.

My invention will now be illustrated in connection with the following example but it will be understood that the example is merely illustrative of the invention and not limiting:

*Example I*

100 parts of sodium carbamate consisting of 84.6% (by weight) NaCO₂NH₂, 8.5% NaHCO₃ and 6.9% H₂O are spread in a thin layer on the trays of a drying cabinet or other suitable apparatus, the temperature of which can be controlled, and heated to a temperature of 140° C. for approximately one hour while circulating dry air over the material. The ammonia given off into the circulating air may be removed and recovered by absorption in water, for example. 81.4 parts of a product containing approximately 93% disodium imidodicarboxylate are obtained.

The presence of moisture is undesirable as it causes the evolution of excessive amounts of ammonia giving rise to side reactions. The heating of the sodium carbamate may be carried out in a dry atmosphere comprising air, ammonia, nitrogen, or carbon dioxide, for example.

I claim:

1. A process for producing disodium imidodicarboxylate comprising heating dry sodium carbamate to a temperature at which nitrogen is evolved as ammonia not exceeding 190° C. in a dry atmosphere.

2. A process for producing disodium imidodicarboxylate comprising heating dry sodium carbamate to a temperature of 100°–190° C. in a dry atmosphere.

3. A process for producing disodium imidodicarboxylate comprising heating dry sodium carbamate to a temperature of 140°–150° C. in a dry atmosphere.

ROBERT B. MacMULLIN.